United States Patent [19]

Tanaka

[11] Patent Number: 4,684,144

[45] Date of Patent: Aug. 4, 1987

[54] FRAME BODY OF MOTORCYCLE

[75] Inventor: Toshio Tanaka, Hamamatsu, Japan

[73] Assignee: Yamaha Motor Co., Ltd., Iwata, Japan

[21] Appl. No.: 839,796

[22] Filed: Mar. 14, 1986

[51] Int. Cl.⁴ .............................................. B62R 19/32
[52] U.S. Cl. .................................. 280/281 R; 180/219
[58] Field of Search ....................... 280/281 B, 281 R; 180/219

[56] References Cited

U.S. PATENT DOCUMENTS 2,088,244 7/1937 Kraeft .............................. 280/281 R
2,338,730 1/1944 Morgan et al. ..................... 280/291
2,763,496 9/1956 Poder ............................... 280/281 R Primary Examiner—John J. Love
Assistant Examiner—Donn McGiehan
Attorney, Agent, or Firm—Ernest A. Beutler

[57] ABSTRACT

A motorcycle having an improved lightweight, high strength frame construction made up of a head pipe, a box section member that is affixed, as by welding to the head pipe and a pair of main frame members that form extensions of the box section member and which are affixed to it.

6 Claims, 7 Drawing Figures

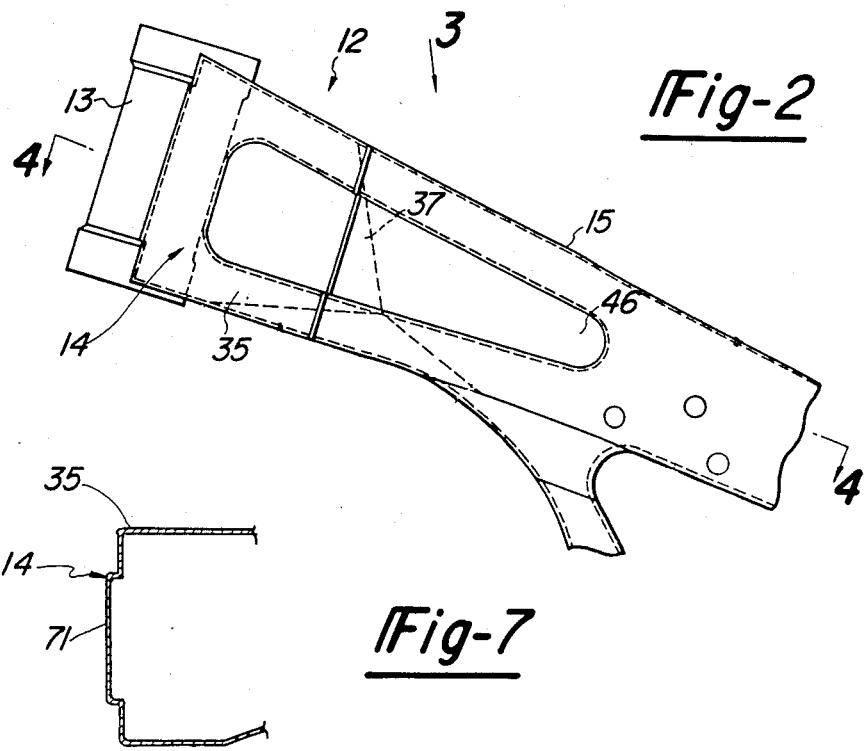
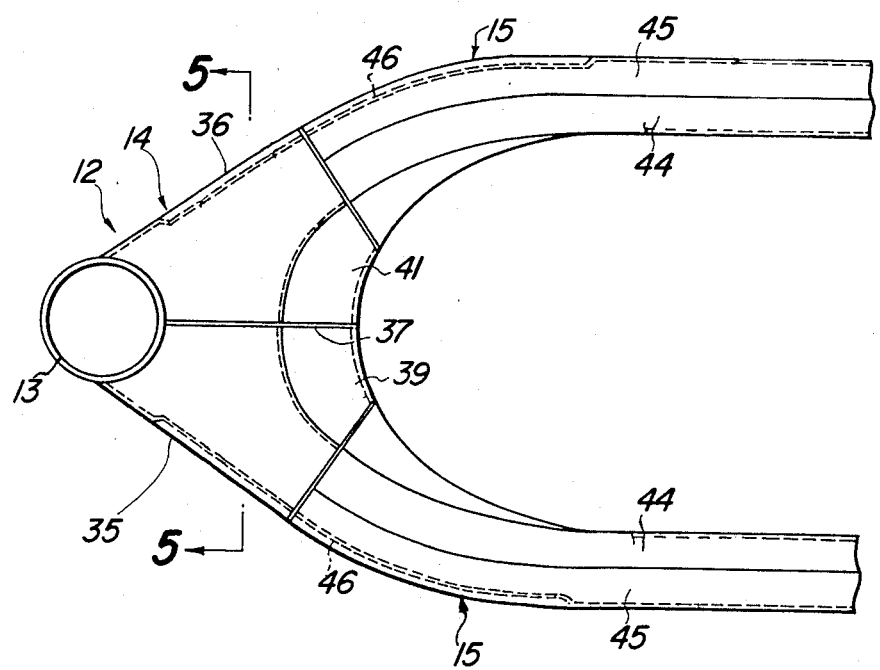

FRAME BODY OF MOTORCYCLE

BACKGROUND OF THE INVENTION

This invention relates to a frame body construction for a motorcycle and more particularly to an improved, lightweight frame construction.

As is well known, the frame of a motorcycle should be extremely strong yet, at the same time, light in weight. It has, heretofore, been the practice to form the frame assembly as a welded up tubular component so as to achieve the desired objects. However, the use of tubular members from which the entire frame is formed has certain disadvantages and does not always insure the greatest strength to weight ratio.

It is, therefore, an object of this invention to provide an improved lightweight, high strength frame for a motorcycle.

It is another object of this invention to provide a lightweight frame assembly for a motorcycle that use formed frame sections.

Most motorcycle frames employ a head pipe that supports the front wheel for its steering movement and one or more main frame members that are joined at their forward ends to the head pipe and which extend rearwardly. Because the main frame members generally provide the suspension support for the rear wheel and the head pipe supports the front wheel, there can be considerable bending stresses applied at the joint between the head pipe and the main frame members.

It is, therefore, a still further object of this invention to provide a frame assembly for a motorcycle wherein this highly stressed joint is rigidly constructed and not likely to fail.

SUMMARY OF THE INVENTION

This invention is adapted to be embodied in a frame construction for motorcycles or the like that comprise a head pipe that is adapted to journal a front wheel for steering movement. A box section member is affixed to the head pipe and extends rearwardly therefrom and is defined at least in part by a pair of spaced apart side walls. A pair of formed main frame members having side walls aligned with and affixed to the box section member side walls extends rearwardly from the box section member. Means are provided for suspending a rear wheel from the main frame members.

BRIEF DESCRIPTION OF THE DRAWINGS

FIG. 2 is an enlarged side elevational view showing a portion of the frame construction.

FIG. 3 is a top plan view of the frame portion shown in FIG. 2 and looking generally in the direction of the arrow 3 in FIG. 2.

FIG. 7 is a partial cross-sectional view, in part similar to FIG. 5, showing another embodiment of the invention.

DETAILED DESCRIPTION OF THE PREFERRED EMBODIMENTS

Figure 1:
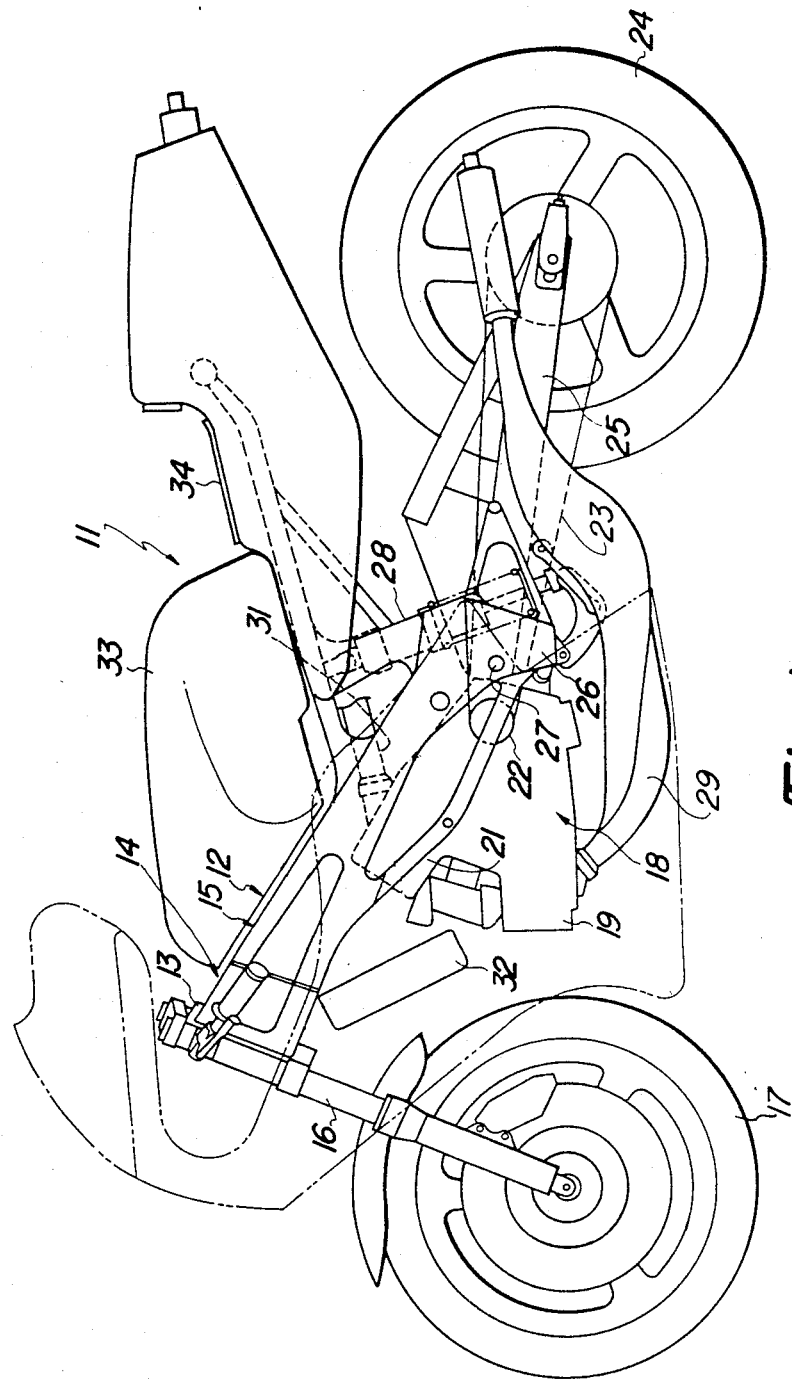
FIG. 1 is a side elevational view of a motorcycle constructed in accordance with an embodiment of the invention, with portions shown in phantom.
Figure 4:
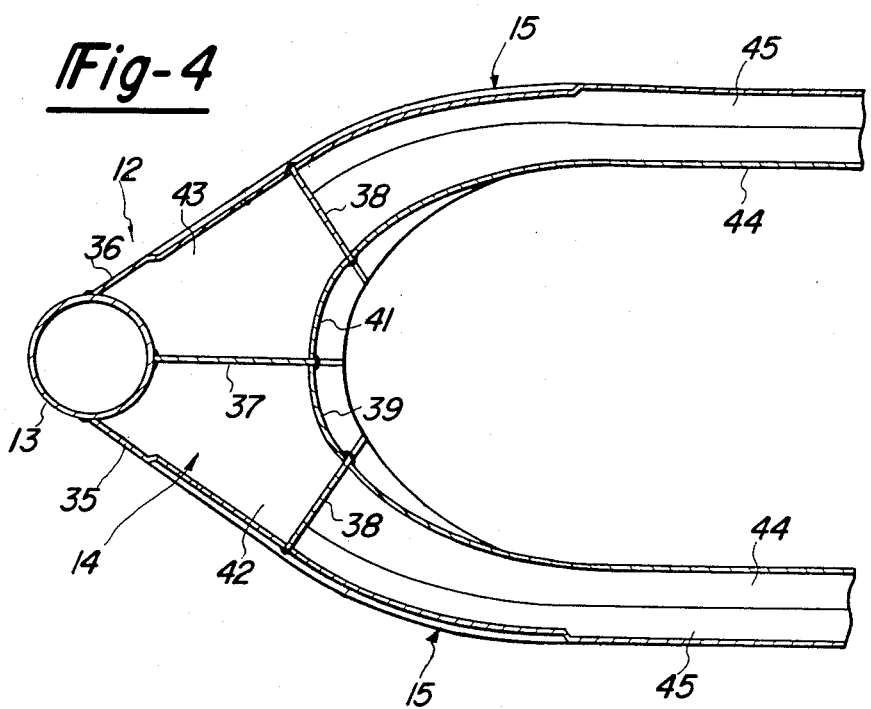
FIG. 4 is a cross-sectional view taken along the line 4—4 of FIG. 2.
Figure 5:
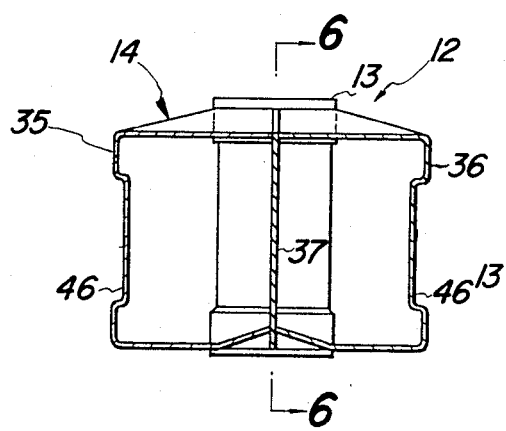
FIG. 5 is a cross-sectional view taken along the line 5—5 of FIG. 3.
Figure 6:
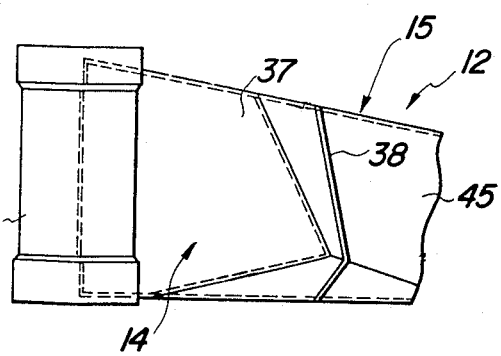
FIG. 6 is a cross-sectional view taken along the line 6—6 of FIG. 5.

Referring first primarily to FIG. 1, a motorcycle constructed in accordance with an embodiment of the invention is identified generally by the reference numeral 11. The motorcycle 11 has a frame assembly, indicated generally by the reference numeral 12 and which is constructed in accordance with the invention. The frame assembly 12 will be described in more detail as this description proceeds, however, it is comprised generally of a head pipe 13, a box section member assembly, indicated generally by the reference numeral 14 and which is secured to the head pipe 13 in a manner to be described, and a pair of main frame members 15 which are connected to the head pipe 13 via the box section member 14, in a manner to be described.

A front fork assembly 16 is dirigibly supported, in a known manner, by the head pipe 13 and rotatably journals a front wheel 17 at its lower end. The fork assembly 16 may include a suspension arrangement for permitting suspension movement of the front wheel 17 in a known manner.

An engine transmission assembly, indicated generally by the reference numeral 18 is supported in the frame 12. In the illustrated embodiment, the engine transmission assembly 18 is depicted as being of the V type and is disposed so that one of its cylinder banks 19 extends horizontally and the other of its cylinder banks 21 is inclined upwardly and forwardly from the horizontal. The engine transmission assembly 18 also includes a crankcase positioned change speed transmission which drives an output sprocket 22 in a known manner. The output sprocket 22 drives a chain 23 which, in turn, drives a rear wheel 24 in a known manner.

The rear wheel 24 is suspended by means of a trailing arm assembly 25 that is pivotally supported by a casting 26 of the main frame assembly for pivotal movement about a pivot axis 27. A combined shock absorber spring assembly 28 cushions the suspension movement of the trailing arm 25 and rear wheel 24.

The cylinder banks 19 and 21 of the engine 18 are provided with respective exhaust systems 29 and 31 for discharge of the exhaust gases to the atmosphere.

The engine 18 is of the water cooled type and for this purpose, a cooling radiator 32 is supported at the forward end of the frame assembly 12. Coolant is circulated from the engine cooling jackets through the radiator 32 in a known manner.

A fuel tank 33 is supported by the frame assembly 12 above the engine 18 and rearwardly of the head pipe 13. A seat 34 is carried rearwardly of the fuel tank 33 on the frame assembly 12 in an appropriate manner.

The construction of the motorcycle 11 as thus far described may be considered to be generally conventional, except for the inclusion of the box section member 14 of the frame assembly 12 and for that reason, the remaining details of the construction of the motorcycle 11 will not be described.

Referring now primarily to the remaining figures, the construction of the frame assembly 12 will be described and particularly the relationship between the head pipe 13, box section member 14 and main frame members 15. The box section member 14 is comprised of a pair of side pieces 35 and 36 that are affixed at their forward ends to the head pipe 13, as by welding, and extend rearwardly therefrom. The side pieces 35 and 36 diverge from the head pipe 13 as clearly shown in FIGS.

3 and 4. A central piece 37 is affixed at its forward end to the head pipe 13 and extends generally rearwardly along the center plane of the motorcycle 11 between the side pieces 35 and 36. Bulkhead pieces 38 are affixed to the rear ends of the side pieces 35 and 36 and extend in a generally inward direction. The inner termination of the bulkhead pieces 38 and the rear edge of the piece 37 are joined together by arcuate sections 39 and 41 which are welded to the rear ends of these respective pieces. Hence, the box section member 14 is formed with a pair of internal cavities 42 and 43. These cavities are closed at their upper and lower ends by integrally formed upper and lower walls of the side members 35 and 36 as clearly shown in the figures.

The main frame members 15 are each formed of a box section configuration made up of an inner channel shaped piece 44 and an outer channel shaped piece 45 which pieces are welded together along their mating faces. The outer surface of the pieces 45 extends in a continuous manner from the side wall portion 35 and 36 of the box section member 14 and the inner surfaces of the portions 44 extend rearwardly as a continuation of the curved walls 39 and 41 of the box section member. Hence, a very smooth and continuous appearance is provided. In addition, the joint which results from this connection is quite strong and will be able to absorb the loads applied to the frame joint from the front and rear wheels 17 and 24. In order to provide further reinforcing, embossments 46 may be formed in the outer surfaces of the box section 14 and the main frame members 15.

FIG. 7 shows another form of reinforcing where rather than an embossment that forms an inwardly extending cavity, the main frame members and box section member are formed with outwardly extending projections 71 for the same reinforcing purpose.

It should be readily apparent from the foregoing description that an extremely rigid and good appearing frame construction results that will have high strength.

The frame may be made up of members that are formed from either aluminum or steel or any other suitable material. Although two embodiments of the invention have been illustrated and described, various changes and modifications may be made without departing from the spirit and scope of the invention, as defined by the appended claims.

What is claimed is:

1. A frame construction for a motorcycle or the like comprising a tubular head pipe adapted to journal a front wheel for steering movement, a box section member formed from sheet metal pieces affixed to said head pipe and extending rearwardly therefrom and defined at least in part by a pair of spaced apart side walls, a pair of formed main frame members having side walls aligned with, separated from and affixed to said box section member side walls and extending rearwardly therefrom, and means for suspending a rear wheel from said main frame members.

2. A frame construction as set forth in claim 1 wherein the main frame members have a box section cross-sectional configuration.

3. A frame construction as set forth in claim 2 wherein both the inner and outer side walls of the main frame members are affixed to the box section member side walls.

4. A frame construction as set forth in claim 2 wherein the box section side members are formed from a two-piece generally channel shape configuration.

5. A frame construction as set forth in claim 2 further including a reinforcing means extending through the box section member side wall and into the main frame member side walls.

6. A frame construction as set forth in claim 5 further including upper and lower surfaces formed on the box section member and affixed to upper and lower surfaces on the main frame members.

* * * * *